United States Patent [19]
Colton et al.

[11] Patent Number: 5,744,940
[45] Date of Patent: Apr. 28, 1998

[54] FUEL TANK HAVING PASS THROUGH CONDUITS

[75] Inventors: Mark W. Colton, Clay; Vincent P. Fecteau; Vincent D. Green, both of East Syracuse, all of N.Y.

[73] Assignee: Carrier Corporation, Syracuse, N.Y.

[21] Appl. No.: 578,263

[22] Filed: Dec. 26, 1995

[51] Int. Cl.$^6$ .................................................. H02K 5/00
[52] U.S. Cl. ...................... 322/1; 123/2; 123/3; 290/1 A
[58] Field of Search ...................... 123/2; 322/1; 290/1 B

[56] References Cited

U.S. PATENT DOCUMENTS

| | | | |
|---|---|---|---|
| 3,792,688 | 2/1974 | Grainger | 122/248 |
| 4,548,164 | 10/1985 | Ylonen et al. | 123/2 |
| 4,573,435 | 3/1986 | Shelton | 123/3 |
| 4,732,360 | 3/1988 | Bodenheimer | 248/645 |
| 4,748,824 | 6/1988 | Wakabayashi et al. | 62/239 |
| 4,834,401 | 5/1989 | Harrington et al. | 280/833 |
| 4,835,405 | 5/1989 | Clancey et al. | 290/1 A |
| 4,871,922 | 10/1989 | Heinrich et al. | 290/18 |
| 5,181,541 | 1/1993 | Bodenheimer | 137/899 |
| 5,673,738 | 10/1997 | Spaulding | 141/392 |
| 5,678,512 | 10/1997 | Colton | 123/2 |

*Primary Examiner*—Steven L. Stephan
*Assistant Examiner*—Nicholas Ponomarenko

[57] ABSTRACT

A self contained generator set of the type which includes a fuel tank made up of a base section and a pair of vertically extending tower sections. The motor generator assembly is mounted on the base section between the two vertically extending tower sections. A passageway is formed in each of the vertically extending fuel tank sections by communicating openings formed in opposite side walls of each of the fuel tank sections with a pipe section welded thereto. The passageways allow passage of the motor generator assembly's exhaust pipe and the generator's power cable therethrough.

9 Claims, 5 Drawing Sheets

FUEL TANK HAVING PASS THROUGH CONDUITS

BACKGROUND OF THE INVENTION

The present invention relates to self contained engine driven electrical generators. More particularly, the invention relates to a self contained engine driven electrical generator of the type used in connection with a refrigerated transport container wherein the engine, generator and other principal components are assembled in a single module, which may be readily detached and removed from the unit to which it is operably connected.

An increasingly popular way of transporting goods makes use of removable cargo carrying containers, commonly referred to as "intermodal" containers, which are adapted for transport over both land and water. Such containers are designed for transport by truck or rail to a freight terminal or ship loading dock, where they may be transferred to a ship for overseas delivery.

Many of such containers are provided with refrigeration units which allow them to transport perishable goods therein. The refrigeration units attached to such containers include an electric motor for driving a refrigerant compressor forming a part of the unit. As a result, they require a source of electrical power for operation. When located at a freight terminal, a refrigerated container is provided with electrical power though a connection to a conventional source of electrical power. When located on a ship, a refrigerated container receives electrical power from the ship's electrical system. When being transported by road, rail or when no other power source is available, a self contained temporary power source which includes a motor generator set, may be mounted directly to the refrigerated container.

Since the generator set is a self-contained source of auxiliary power, it is necessary that an integral pan thereof be a fuel tank for the motor, which is typically a diesel engine. Many generator sets are required to have the capability to provide uninterrupted service for an extended length of time. For example, for transcontinental rail shipping, it is desirable to have a generator set which is capable of operating for more than 130 hours without requiring refueling. Such extended use capabilities also will increase the reliability of the system and decrease operating costs. Accordingly, it is desirable to provide a high capacity integral fuel tank for such a generator set.

It should be appreciated that space is extremely limited in the design of such s generator set. Such space limitations are a result of the environment in which they are used wherein there are limitations on components extending beyond a prescribed envelope universally defined by the width of the containers on which they are used. Also, because the units are quite often mounted on containers being towed by tractor trailers, size limitations are dictated by the necessity of providing adequate clearance between the unit and the tractor unit. Further space limitations are dictated by the requirement that the generator set not extend vertically above the top of the container on which it is mounted nor should it extend downward such that it would interfere with the condenser discharge and the operating controls of the refrigeration unit.

One approach to achieving a high capacity fuel tank is to provide a substantially U-shaped fuel tank having a lower section, which underlies and supports the motor generator and other components of the generator set and which comprises towers which extend upwardly on both sides of the generator set. It is desirable for these towers to be as high as possible, within the confines of the unit, to maximize fuel capacity.

While such a fuel tank design provided a substantial increase in fuel capacity, it introduces another problem. The new problem was how to reroute the engine exhaust pipe and power cable from the generator set, confined by the fuel tank, to the outside of the unit.

SUMMARY OF THE INVENTION

According to the present invention, a fluid storage tank includes wall means which define an enclosed volume for the storage of a fluid therein. The wall means are provided with a first opening therethrough and a second opening therethrough, which is spaced from the first opening. An open conduit is disposed within the enclosed volume of the tank. The conduit has a first portion which circumferentially engages and is sealingly attached to the first opening and a second section which circumferentially engages and is sealingly attached to the second opening.

In a preferred embodiment, the storage tank is a fuel tank for a self contained generator set of the type which includes a base section and a vertically extending tower section. A motor generator assembly is mounted on the base section of the fuel tank. The motor generator has a motor, which includes an exhaust pipe. A passageway is provided in the vertically extending section of the fuel tank which allows the exhaust pipe to pass therethrough.

BRIEF DESCRIPTION OF THE DRAWINGS

This invention may be better understood and its objects and advantages will become apparent to those skilled in the art by reference to the accompanying drawings, in which.

DESCRIPTION OF THE PREFERRED EMBODIMENT

Figure 1:
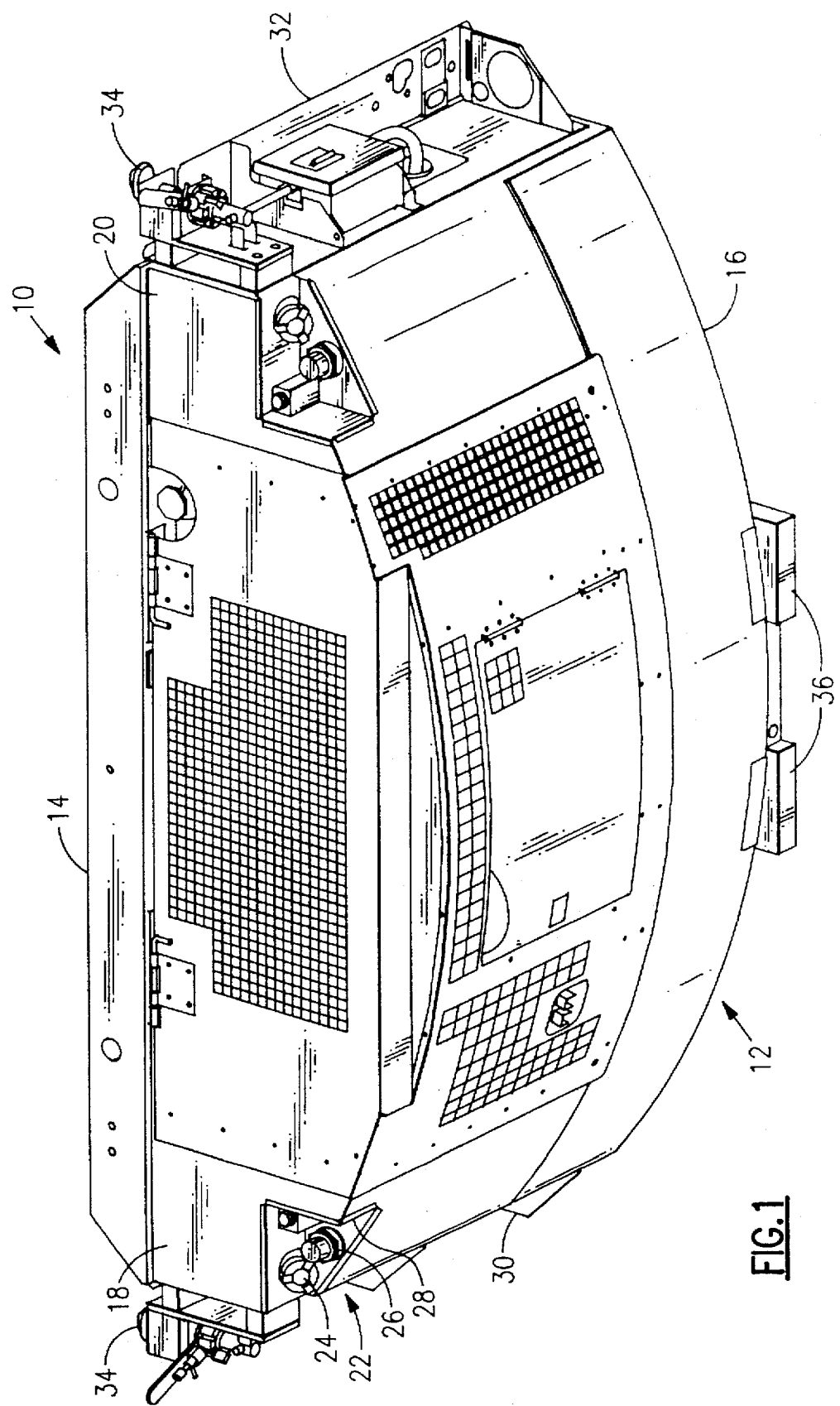
FIG. 1 is a perspective view of a self contained generator set according to the present invention with the outer cover installed.

FIG. 1 is a perspective view of a diesel driven generator set 10, which is adapted for mounting on the end of refrigerated container in order to provide electric power to a refrigeration unit which is also mounted on the container. In operation, the generator set 10 provides a constant electrical power supply for operation of the all electric refrigeration unit. Neither the container nor the refrigeration unit are shown in the drawings or will be described herein as they are conventional and well known in the art. A container refrigeration unit adapted for mounting on a refrigerated container, and with which the generator set of the present invention may be used, is manufactured and sold by the Carrier Transicold Division of Carrier Corporation and marketed as Model Series NT.

The structural framework of the generator set comprises a U-shaped fuel tank generally designated by reference numeral 12 and a number of structural elements, including an angle iron 14, which extends across substantially the entire back side of the generator set.

The fuel tank 12, fabricated from structural steel plate, comprises a lower section 16, which extends across substantially the entire bottom of the generator set 10. Extending from the left and right hand sides of the lower tank 16 are left and right hand tower portions of the fuel tank, 18 and 20, respectively. Each of the towers 18 and 20 is fluidly interconnected with the lower tank section 16. Each of the towers 18 and 20 is provided, at its upper end thereof, with a fuel fill shelf 22, which is provided with an appropriate fuel fill 24, fuel gage 26 and fuel vent 28.

The previously described structural angle 14 is welded to the top of the back side of the fuel towers 18 and 20. Other structural elements include left and right hand vertically extending structural members 30 and 32, respectively, located at the left and right hand ends of the generator set. Preferably, these structural elements 30 and 32 are welded to the left and right hand facing surfaces of the fuel tank towers 18 and 20, respectively. Mounted to the upper end of the structural elements 30 and 32 are suitable clamps 34, well known in the art, which are adapted to structurally attach the generator set 10 to a refrigeration container as is well known in the art.

Underlying the lower portion 16 of the fuel tank 12 are a pair of structural forklift pockets 36, which form an integral part of the generator set structure and facilitate engagement by a forklift for lifting the unit and positioning it for attachment to a refrigerated container.

Figure 5:
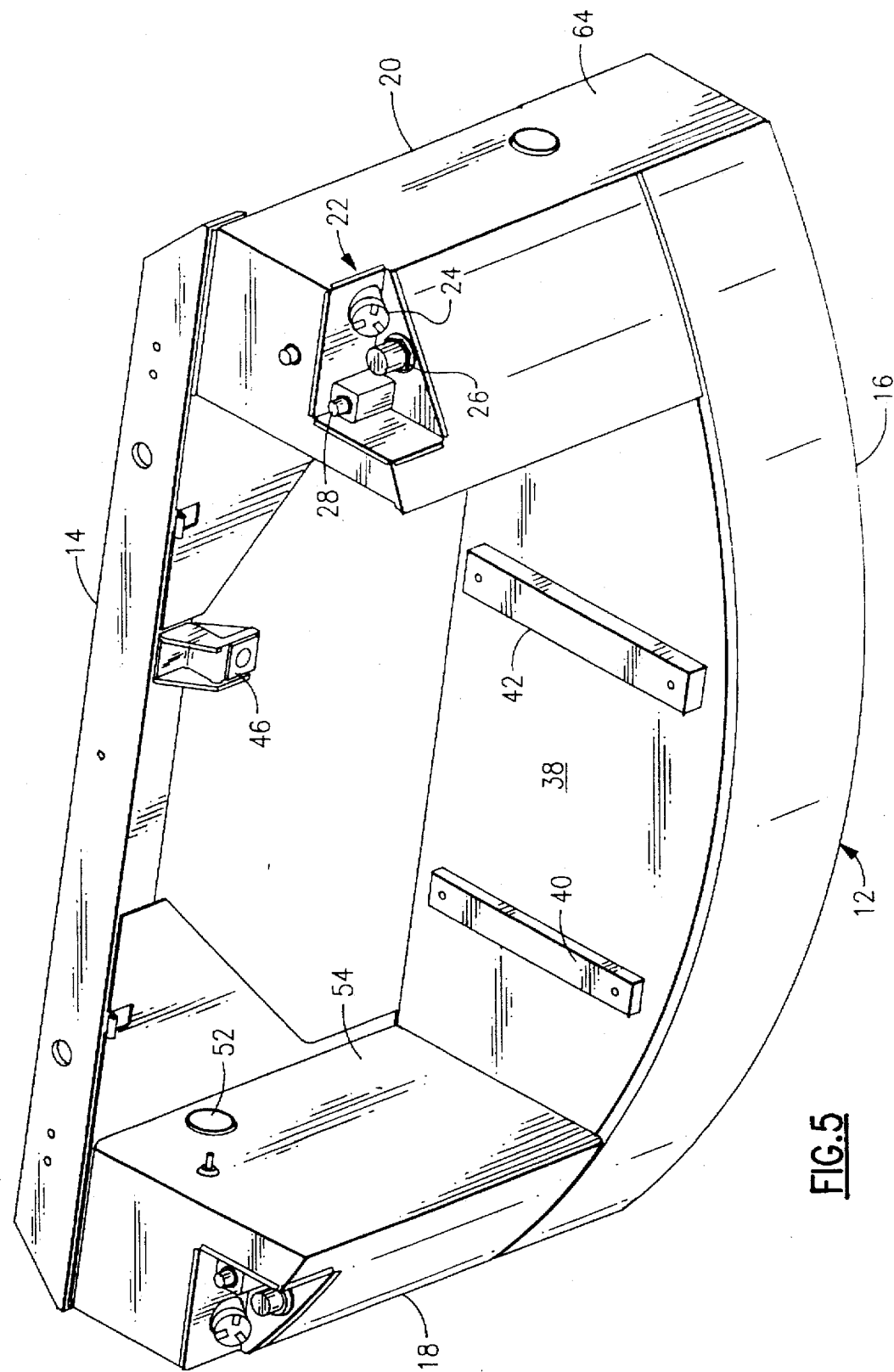
FIG. 5 is a perspective view of the generator set of FIG. 1 with many of the components removed therefrom to show details of the fuel tank and the passages therethrough.

As best shown in FIG. 5, the upwardly facing planar surface 38 of the lower portion 16 of the fuel tank 12 has a pair of mounting bars 40 and 42 attached thereto. Attached to the angle iron 14 is an angular mounting bracket 46. The mounting bars and the bracket are the attachment points for the motor and generator of the generator set.

Figure 2:
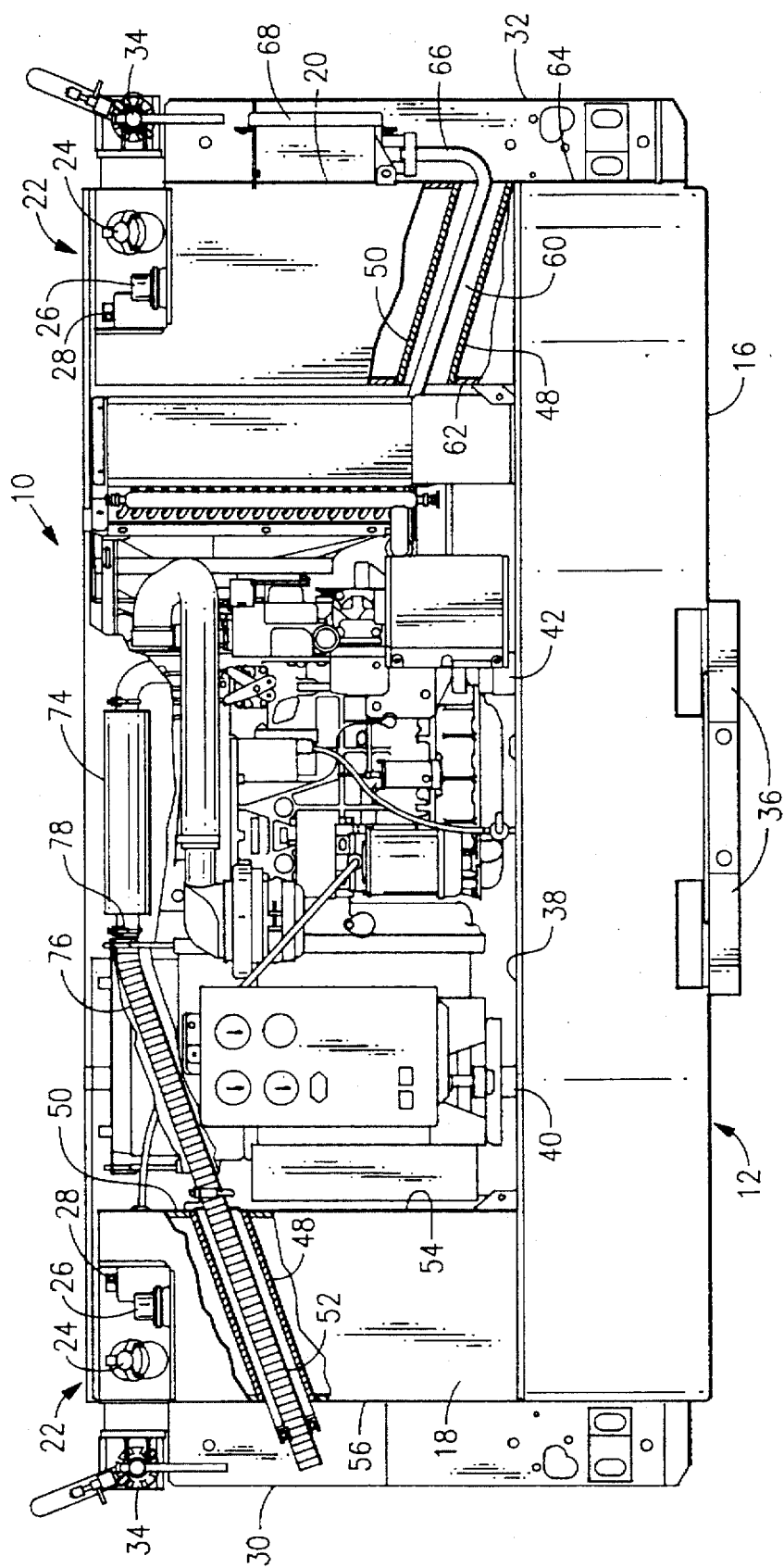
FIG. 2 is a front elevation view of the generator set of FIG. 1 with the cover removed and partially broken away.
Figure 3:
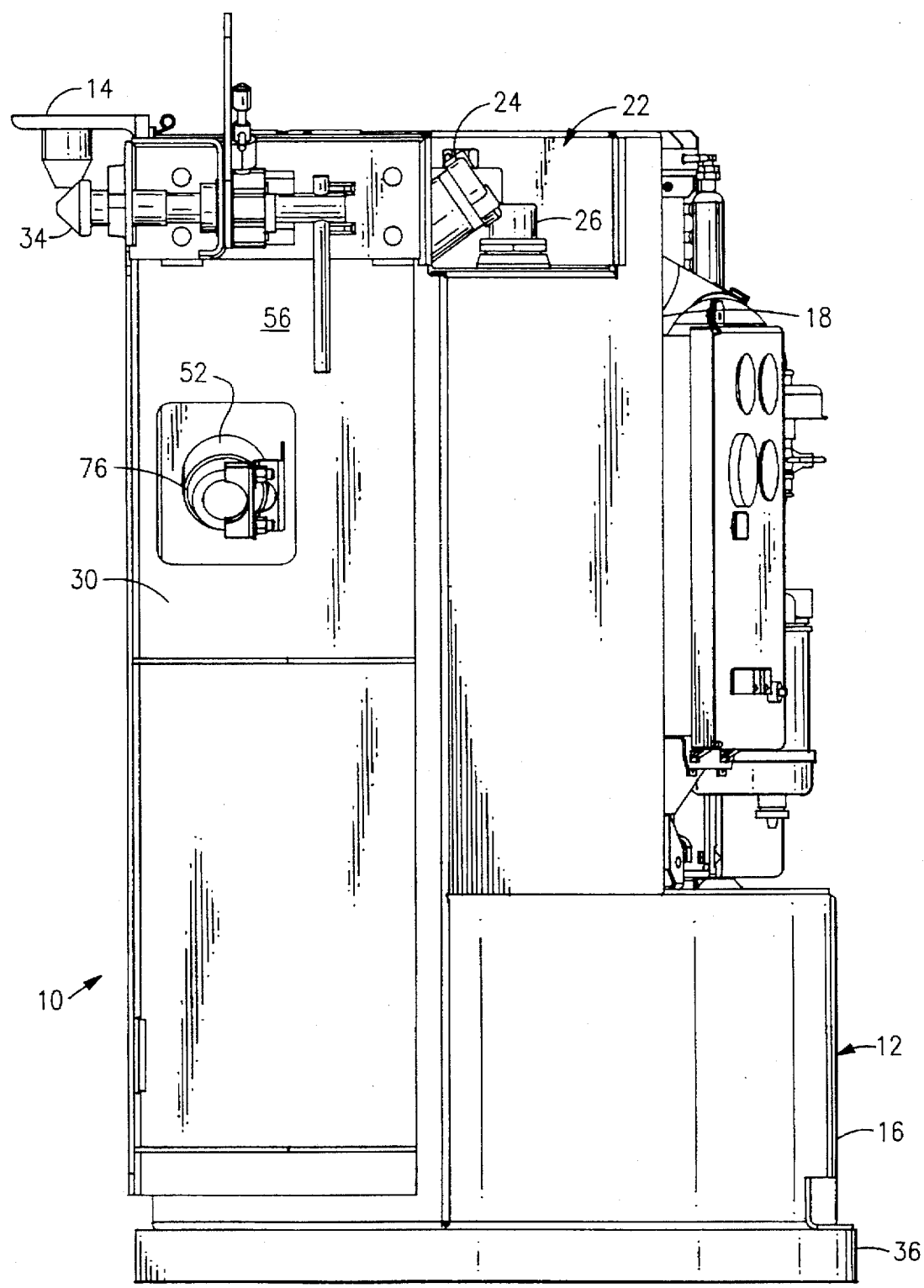
FIG. 3 is a left side view of the unit illustrated in FIG. 2.

As best shown in FIGS. 2, 3, and 5, the left hand fuel tank tower 18 is provided with a circular passage 52 extending from the interior wall thereof 54 to the exterior wall 56. The passage is formed from a steel pipe section 48 integrally welded to openings 50 cut into the walls 54 and 56. As will be described in more detail, the exhaust pipe 58 from the engine of the generator set passes through the passage 52. The passage is inclined downward to facilitate drainage of rainwater or the like from the pipe 48.

In a like manner, the right hand tower 20 of the fuel tank is provided with a passage 60 extending from the interior wall 62 to the exterior wall 64 thereof. This passage 60 is adapted to receive the power cable 66, which interconnects the generator set 10 with a receptacle box 68 mounted on the right hand vertically extending structural member 32.

It should be appreciated that both of the passages 52 and 60 provide a convenient, easily fabricated passageway from the interior of the "confines" of the generator set 10 with a minimum of additional parts and while allowing the maximum capacity of the fuel tank. To emphasize the simplicity, each passage requires a simple length of purchased pipe or tubing, cut to length, and a single hole being cut in each panel of the fuel tank which is penetrated. The welding of the pipes to the fuel tank panels are relatively simple circumferential fillet welds.

Figure 4:
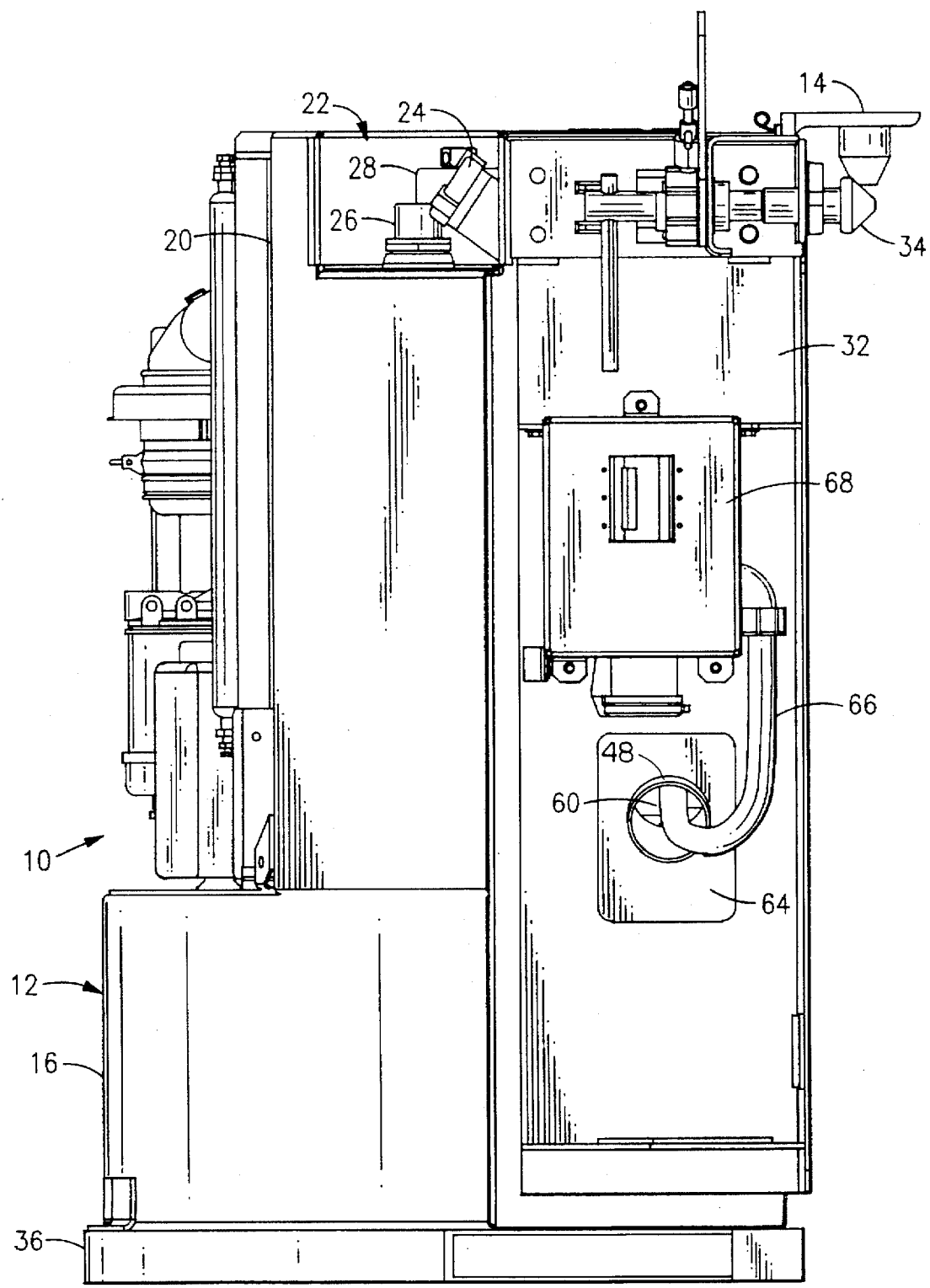
FIG. 4 is a right side view of the unit illustrated in FIG. 2.

Looking now at FIGS. 2, 3 and 4, again, the generator set includes principally a diesel engine 70 and a generator 72, which is coupled directly to the engine flywheel. The generator provides a constant 460 vac three phase, 60 hertz electrical supply which is conducted from the generator 72 via power cable 66 which passes directly through passage 60 in the right hand fuel tank tower 20 where it is interconnected as shown in FIG. 4 to a receptacle box 68.

The muffler 74 of the diesel engine 70 is connected to the exhaust manifold of the engine and has an exhaust pipe 76 connected directly to the outlet 78 of the muffler. The exhaust pipe 76 passes directly from the muffler outlet through the passage 52 in the left hand fuel tank tower 18 and thence exhausts to the exterior of the generator set. It should be noted that the passage 52 and the exhaust pipe passing therethrough are sized such that a circumferential air space surrounds the exhaust pipe to facilitate cooling of the exhaust pipe and to prevent any undesired overheating of the fuel tank.

What is claimed is:

1. A fluid storage tank comprising:

wall means defining an enclosed volume for the storage of a fluid therein;

a first opening in said wall means;

a second opening in said wall means spaced from said first opening; and an open conduit disposed within said enclosed volume, said conduit having a first portion thereof circumferentially engaging and sealingly attached to said first opening, said conduit having a second portion there of circumferentially engaging and sealingly attached to said second opening.

2. The apparatus of claim 1 wherein each of said first and second openings are circular; and wherein said conduit comprises a substantially straight tubular section having a circular cross section which has an outer diameter substantially the same as the diameter of said circular openings.

3. The apparatus of claim 2 wherein said tank and said conduit are both fabricated from steel and said sealing attachment is a weld.

4. The apparatus of claim 1 wherein said tank comprises two substantially planar sides and wherein said first opening is located in one of said sides; and said second opening is located in the other of said sides.

5. The apparatus of claim 4 wherein said two planar sides are parallel to one another.

6. A self contained generator set of the type including a fuel tank comprising a base section and a substantially vertically extending section; the generator including a motor generator assembly mounted on said base section of said fuel tank, said motor having an exhaust pipe, wherein the improvement comprises:

a passageway in said vertically extending section of said fuel tank adapted to allow said exhaust pipe to pass therethrough.

7. The apparatus of claim 6 wherein said fuel tank comprises two vertically extending sections spaced from one another to define a region therebetween, and said motor generator assembly is mounted on said base section, further including a passageway in said second vertically extending fuel tank section passing from said region to the other side of said second vertically extending section.

8. The apparatus of claim 7 wherein the generator of said motor generator assembly includes a power cable, and wherein said power cable passes through said passageway of said second vertically extending fuel tank section to the other side of said fuel tank section.

9. The apparatus of claim 8 wherein each of said vertically extending fuel tank sections comprises a pair of substantially vertically extending spaced parallel walls; each of said spaced parallel walls having a circular opening therein, wherein said passageway comprises a circular conduit disposed in the interior of each of said vertically extending sections, said conduit being welded at opposite ends thereof to said openings in said spaced vertical sections.

* * * * *